Dec. 1, 1936.  F. J. HOOVEN  2,062,906
DIRECTION FINDER
Filed April 4, 1934
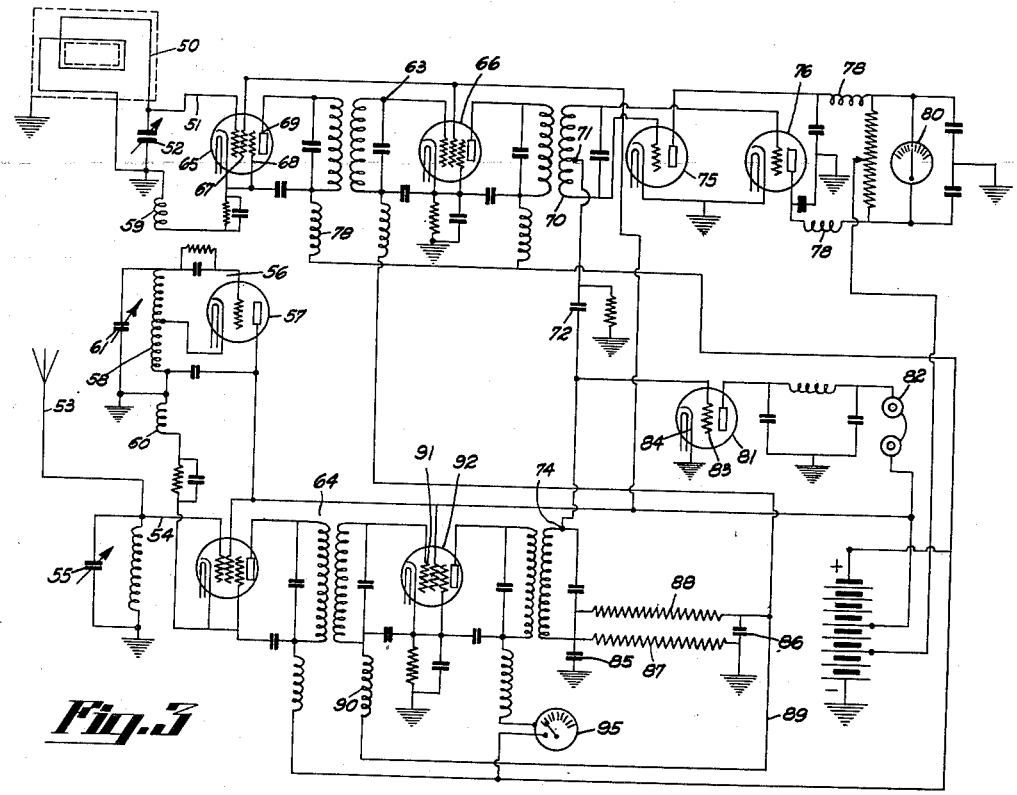
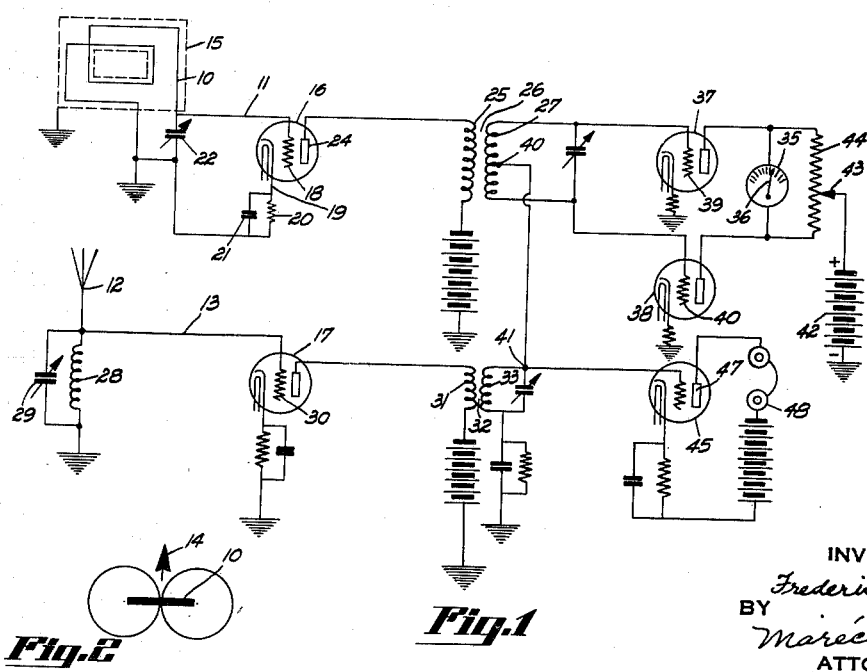
INVENTOR
Frederick J. Hooven
BY
Maréchal & Noe
ATTORNEY Patented Dec. 1, 1936

2,062,906

UNITED STATES PATENT OFFICE 2,062,906

DIRECTION FINDER

Frederick J. Hooven, Dayton, Ohio

Application April 4, 1934, Serial No. 718,959

9 Claims. (Cl. 250—11)

This invention relates to direction finding apparatus and more particularly to a receiving apparatus adapted for use on airplanes and the like for indicating the direction of flight to a desired objective.

One object of the invention is the provision of a receiving apparatus enabling the pilot of an aircraft to follow a predetermined course, and of comparatively simple construction and designed to operate with unusual accuracy.

Another object of the invention is the provision of a direction finding receiving apparatus embodying receiving circuits connected respectively to directional and non-directional antennas, the received signals being amplified separately and then impressed on a pair of rectifiers, a single coil carrying the entire output of one amplified circuit and being symmetrically connected to both rectifiers to provide for unusual accuracy in operation.

Another object of the invention is the provision of a direction finding receiving apparatus of the character described, a common oscillating circuit being employed in conjunction with the receiving circuits of the directional and non-directional antennas.

Another object of the invention is the provision of a radio receiving direction finder having a heterodyne oscillator and embodying an automatic means for controlling the power outputs of the amplifier circuits.

Other objects and advantages of the invention will be apparent from the following description, the appended claims and the accompanying drawing, in which,—

Fig. 1 is a simplified diagrammatic showing of a direction finding receiving apparatus embodying the present invention;

Fig. 2 is a diagrammatic view showing the positioning of the loop with respect to the direction of movement of the aircraft; and Fig. 3 is a circuit diagram of a preferred form of receiving apparatus.

Referring to the drawing, and with more particular reference to Fig. 1, the apparatus shown in the diagram is a direction finding receiving apparatus such as may be carried on an airplane or the like to enable the aviator to readily determine whether or not he is on his course and flying towards a radio transmitter of known location.

The receiving apparatus in its simple form, as herein shown, comprises a directional antenna such as the loop 10 connected in a receiving circuit designated generally by the reference numeral 11. A non-directional antenna such as the aerial 12 is connected in a receiving circuit 13. The loop 10 as shown in Fig. 2 is arranged transversely of the plane of forward flight indicated by the arrow 14 so that the loop does not receive signals coming from a direction in which the aircraft is flying, but as soon as the airplane deviates from its predetermined course the loop will become more or less effective in receiving the signals in accordance with the deviation of the plane containing the loop from the transverse plane. As indicated by the dotted lines 15 in Fig. 1, the loop is shielded against electro-static effects of the transmitting station.

The signals in the two receiving circuits 11 and 13 are separately amplified by the amplifiers 16 and 17 respectively. As shown in Fig. 1, the amplifier 16 is a vacuum tube having a grid 18 connected to one side of the loop, and having a cathode 19 connected through an impedance 20 and a condenser 21 to the other side of the loop and to ground. Suitable means such as a variable condenser 22 is provided for tuning the receiving circuit containing the loop. The plate 24 is connected to the primary 25 of a transformer 26. The amplified signals are thus imposed on the transformer secondary 27.

The aerial 12 is connected through an impedance 28 and the tuning condenser 29 to the ground, and is also connected to the grid 30 of the tube 17. The plate of the tube is connected to the primary 31 of a transformer 32. The secondary 33 of the transformer comprises a single coil which carries the entire output of the amplifier circuit connected to the non-directional antenna.

35 represents an indicator such as a differential galvanometer, having an indicating needle 36 adapted to swing to either side of a zero position depending upon the direction of current flow. The indicator is connected to two detectors herein shown as the vacuum tubes 37 and 38, the grids 39 and 40 of which are connected symmetrically to opposite sides of the secondary or coil 27. The amplified signals coming from the amplifier 16 are thus impressed out of phase on the two grids of the two detectors. When the aircraft is flying directly towards the transmitter there will be no differential current flow created by the connections between the rectifiers and the coil 27 as the loop will be transversely arranged with respect to a line connecting the sending station and the aircraft. However, when the aircraft deviates from its intended course, signals will be impressed on the grids of the two rectifiers, which are thus energized substantially 180 degrees out of phase, and the current flow in the galvanometer will swing the needle to one side or the other dependent upon the deviation from the intended direction of flight.

The winding 27 is provided with a center tap 40 which is connected at 41 to one side of the winding 33, the other side of the winding being connected to ground and through the ground to a battery 42 and an adjustable pointer 43 of a potentiometer 44 which is connected across the plates or anodes of the rectifiers and across the galvanometer. Thus the signal received by the non-directional antenna and amplified in the amplifier 17 is imposed equally and symmetrically and in phase on the input sides of the two rectifiers so as to be without turning effect on the needle of the galvanometer. The signal impressed on the rectifiers, when the aircraft gets off its course is thus the vector sum of the signals received by the two receiving circuits which is impressed on one detector and the vector difference of the signals of the two receiving circuits which is impressed on the other rectifier.

Inasmuch as the signals received by the loop and by the non-directional antenna are separately amplified and thereafter properly joined and impressed on the rectifiers, any difference in the amplification factors of the amplifier tubes will be a matter of no moment, as the power of the signal coming from the winding 33 does not have to be any particular value with respect to the signal coming from the winding 27. If, however, the signals are added together and then amplified a difference in the amplification factors of the amplifier tubes would create an error producing a deflection of the needle even with no power input on the loop. Moreover to prevent any errors arising such as would tend to unbalance the power inputs of the two rectifiers at a time when no power is received by the loop, the coil 33 is a single winding operating in common in the connections to the two grids of the rectifiers. Were two separate windings employed instead of the single winding 33 and were these two separate windings separately connected one to the grid of one rectifier and the other to the grid of the other rectifier, then any small difference in the impedances of the windings would be productive of an error such as would create a deflection of the galvanometer needle when the loop 10 is arranged transversely of the intended flight direction. By arranging the windings 27 and 33 in the manner described, however, the possibility of error is greatly minimized and unusual accuracy and care is not required in exactly balancing the connections between the amplifiers and the input sides of the rectifiers.

Connected to one end of the winding 33, at 41, is a detector tube 45 having an output element 47 connected to a pair of receiving devices 48 so that the pilot can listen to the speech or sound broadcast from the station towards which he is flying and so he can readily tune in the receiving circuits for any particular station. The power is supplied to the detector 45 from the amplifier circuit of the non-directional aerial so that the signals will be perceptible in the ear phones 48 at all times and so as not to unbalance the power supply to the rectifiers 37 and 38 from the amplifier circuit of the directional antenna.

Fig. 3 shows a preferred form of the receiving apparatus, incorporating a heterodyne circuit productive of oscillations which are equally imposed from the single common oscillator on the receiving circuits connected with the directional and with the non-directional antennas. Thus as shown in Fig. 3 the loop 50 is connected in a receiving circuit 51, tuning means 52 being provided to tune the receiving circuit to the frequency of the radio oscillations coming from the broadcasting station towards which the aircraft is supposed to fly. The non-directional antenna 53 is connected in a receiving circuit 54 and tuned by a condenser 55 or the like.

A common oscillating means such as the oscillator circuit 56 is provided, connected symmetrically to the receiving circuits 51 and 54. The oscillator as herein shown comprises an oscillating tube 57 having its grid and plate connected across a coil 58 which is inductively related to the two windings 59 and 60, one contained in receiving circuit 51 and the other contained in the receiving circuit 54. The oscillator can operate at a frequency for example of 1000 kc. The received signals coming from the broadcasting station may be at a frequency of, let us say, 1100 kc., thus the beat note produced in the receiving circuit is at a frequency of 100 kc. The oscillator as well as the receiving circuits is adapted to be tuned by tuning condensers 61 to produce a predetermined heterodyne or beat frequency of oscillation that can be readily amplified in the amplifiers designated generally by the reference numerals 63 and 64. The amplifier 63 separately amplified the heterodyned received signal coming from the loop, while the amplifier 64 separately amplifies the heterodyned signal coming from the non-directional antenna 53. As herein shown, the amplifier tubes 65 and 66 of the two amplifying circuits are of the 6D6 type, having a screen grid 67 and a suppressor grid 68. The output or plate element 69 is connected to a transformer the secondary of which is connected to a following tube thus providing two stages of amplification.

The amplified signal from the directional antenna circuit is supplied to the winding 70 having a center tap 71 which is connected through direct current blocking condensers 72 to one end of the winding or coil 74 that is connected so as to carry the entire amplified output of the non-directional aerial circuit. The coils or windings 70 and 74 are connected in a manner previously set forth in discussing Fig. 1 of the drawing to the two rectifiers 75 and 76 so that the signal of the single winding 74 carrying the entire amplified output of the non-directional receiving circuit is symmetrically impressed on the two rectifiers, in phase, thus exactly balancing the effect of a power flow through winding 74. The winding 70 is connected at its opposite ends to the two rectifier input elements so as to impress signals out of phase on the two rectifiers, thus producing a swing of the galvanometer when signals of the predetermined beat frequency are flowing through the coil 70. Suitable radio frequency choke coils are provided at various points to suppress oscillations of radio frequency although permitting the passage of signals of the comparatively low frequency of the beat note.

It will thus be apparent that the signals coming in via the loop and the non-directional antenna are combined with the oscillations generated in the single oscillator so that the beat or heterodyned notes produced in the two receiving circuits are in absolute accordance one with the other. The heterodyned signals are then separately amplified and then impressed equally and symmetrically on the two detectors 75 and 76 so that the needle of the galvanometer 80 will properly indicate a deflection from the intended course.

Connected at one end of the winding 74 is the detector tube 81 having its plate connected to the sound reproducing or earpiece 82, thus permitting the pilot to listen to the received signals and to properly tune the receiving circuits and the oscillating circuits to wave lengths of the various transmitting or broadcasting stations.

The received signal coming from the non-directional antenna circuit is impressed across the grid 83 and the cathode 84 of the detector 81 which rectifies the received signal. The signal impressed on the tube 81 in flowing between the cathode and the grid and through the winding 74 and the condenser 85 serves to charge a condenser 86 connected across impedances 87 and 88, thus energizing the condenser 86 which provides a grid bias through the connection 89 and impedance 90 to the grid 91 of the amplifier tube 92. The grid bias connection is equally applied to the grids of the various amplifying tubes of both the amplifying circuits 63 and 64 in such a way that normally with a received signal of minimum intensity the grid bias is such as to increase to a maximum the amplification powers of the circuits. However, when a signal of high value is impressed on the non-directional aerial and a substantial flow of power takes place between the grid 83 and the cathode 84, the grid bias is automatically changed for the various amplifying tubes, to cut down the amplification factors of the tubes. The power outputs of all the amplifying tubes are thus equally changed in a manner inversely in accordance with the power of the signals received by the non-directional antenna. This provides for a substantial swing of the needle of the galvanometer even though the airplane may be far from the transmitting station and the received signals quite weak. When the airplane is quite close to the transmitting station and the signals are quite powerful, the automatic volume control automatically cuts down the power supplied to the rectifiers 75 and 76 so that an excessive amount of movement of the galvanometer needle is not produced. The amount of deflection of the galvanometer needle will therefore serve as a rough indication of the amount of turn required to bring it back on its course if the pilot has an approximate idea as to the distance between the aircraft and the transmitting station. To give the pilot an idea as to his distance from the station an indicator or galvanometer 95 is connected in the plate circuit of the amplifier tube 92, the deflection of the needle being in accordance with the amount of direct current flow in the plate circuit which is in turn dependent upon the amount of grid bias of the amplifier tubes.

The use of a heterodyne system embodying a common oscillating circuit productive of exactly the same beat frequency in the two receiving circuits provides an extremely sensitive and accurate apparatus permitting a high degree of amplification of the received signals with comparatively few tuning devices for adapting the apparatus to receive signals of different frequencies. The separate amplification of the received signals before the signals are combined to be supplied to the rectifiers, and the use of a common winding symmetrically connected to both of the rectifiers for equally impressing the signals coming in through the non-directional aerial prevents errors that would be produced if separate windings were used each connected to one of the rectifiers in place of the single winding 74 connected symmetrically to both rectifiers. The automatic volume control governs the amount of power supplied to the rectifiers, automatically reducing the very great signal strength that would obtain in a heterodyne system when the airplane is comparatively close to the transmitting station.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A direction finding receiving apparatus comprising a single directional antenna and a non-directional antenna, a radio frequency receiving circuit including the directional antenna, a second radio frequency receiving circuit including the non-directional antenna, an oscillator for generating oscillations, means for impressing the oscillations generated in said oscillator on both said receiving circuits, amplifiers for separately amplifying the beat frequency oscillations in said receiving circuits, a pair of rectifiers, an indicator for indicating the current differentials in the output of said rectifiers, connections from said rectifiers to said amplifiers to impress the signals of one amplifier circuit out of phase and of the other amplifier circuit in phase on said rectifiers, and means for controlling the power output of the amplifier circuits under control of the received signal inversely in accordance with the power of the signals received by the non-directional antenna.

2. A direction finding receiving apparatus comprising a radio frequency receiving circuit including a directional antenna, a second radio frequency receiving circuit including a non-directional antenna, an oscillator for generating oscillations, means for impressing the oscillations generated in said oscillator on both said receiving circuits, amplifiers for separately amplifying the beat frequency oscillations in said receiving circuits, a pair of rectifiers, an indicator for indicating the current differentials in the output of said rectifiers, connections from said rectifiers to said amplifiers to impress the signals of one amplifier circuit out of phase and of the other amplifier circuit in phase on said rectifiers, a sound reproducer connected to the amplifier of the non-directional antenna, means for controlling the power outputs of the amplifier circuits under control of the received signal inversely in accordance with the power of the signals received by the non-directional antenna, and a visual indicator for indicating the signal strength of the non-directional signal.

3. A direction finding receiving apparatus comprising a single directional antenna and a non-directional antenna, a radio frequency receiving circuit including the directional antenna, a second radio frequency receiving circuit including the non-directional antenna, amplifying circuits for amplifying the signals in said receiving circuits, a pair of rectifiers for the amplified signals, means for indicating the current differentials in the out-put of the rectifiers, means connected with the amplifying circuit which connects with said second radio frequency receiving circuit and responsive to the received signals for controlling the amount of amplification of both amplifiers inversely in proportion to the strength of the signal of the non-directional amplifier, and means to indicate the signal strength of the non-directional amplifier.

4. A radio direction finder comprising a directional receiving antenna, a non-directional receiving antenna, separate amplifier circuits connected with each of said antennae, a visual indicating device, a pair of rectifier circuits connected in opposed phase relation with said visual indicating device, circuit connections for impressing the signal energy amplified by each of said separate amplifier circuits upon said pair of rectifier circuits, a bias determining network connected with the amplifier circuit which connects with said non-directional receiving antenna, and connections between said bias determining network and each of said amplifier circuits for controlling the operation thereof inversely in proportion to the amplitude of the signal energy received by said non-directional antenna.

5. A radio direction finder comprising a directional receiving antenna, a non-directional receiving antenna, separate amplifier circuits connected with each of said antennae, a visual indicating device, a pair of rectifier circuits connected in opposed phase relation with said visual indicating device, circuit connections for impressing the signal energy amplified by each of said separate amplifier circuits upon said pair of rectifier circuits, a bias determining network comprising a condenser and a resistor connected with the amplifier circuit that connects with said non-directional receiving antenna, and connections between said resistor and the control circuits of each of said amplifier circuits whereby energy stored in said condenser under control of the signals received by said non-directional antenna are discharged through said resistor for biasing said amplifier circuits and controlling the operation thereof inversely in proportion to the amplitude of the signal energy received by said non-directional antenna.

6. A radio direction finder comprising a directional receiving antenna, a non-directional receiving antenna, separate amplifier circuits connected with each of said antennae, a visual indicating device, a pair of rectifier circuits connected in opposed phase relation with said visual indicating device, circuit connections for impressing the signal energy amplified by each of said separate amplifier circuits upon said pair of rectifier circuits, a bias determining network connected with the amplifier circuit which connects with said non-directional receiving antenna, connections between said bias determining network and each of said amplifier circuits for controlling the operation thereof inversely in proportion to the amplitude of the signal energy received by said non-directional antenna, and a separate visual indicator connected with the amplifier circuit that connects with said non-directional antenna for providing a simultaneously comparable reading with the reading of said first mentioned visual indicating device.

7. A radio direction finder comprising a directional receiving antenna, a non-directional receiving antenna, separate amplifier circuits connected with each of said antennae, a visual indicating device, a pair of rectifier circuits connected in opposed phase relation with said visual indicating device, circuit connections for impressing the signal energy amplified by each of said separate amplifier circuits upon said pair of rectifier circuits, a bias determining network comprising a condenser and a resistor connected with the amplifier circuit that connects with said non-directional receiving antenna, connections between said resistor and the control circuits of each of said amplifier circuits whereby energy stored in said condenser under control of the signals received by said non-directional antenna are discharged through said resistor for biasing said amplifier circuits and controlling the operation thereof inversely in proportion to the amplitude of the signal energy received by said non-directional antenna, and a separate visual indicator connected with the amplifier circuit which connects with said non-directional antenna for providing a simultaneously comparable reading with the reading of said first mentioned visual indicating device.

8. A radio direction finder comprising a directional receiving antenna, a non-directional receiving antenna, separate amplifier circuits connected with each of said antennae, a visual indicating device, a pair of rectifier circuits connected in opposed phase relation with said visual indicating device, circuit connections for impressing the signal energy amplified by each of said separate amplifier circuits upon said pair of rectifier circuits, and a bias determining network connected with the output of one of said amplifier circuits, the output of said bias determining network being connected with the control circuits of both of said amplifier circuits and operative in accordance with the received signal energy to control the amplitude of the combined effective energy impressed upon said visual indicating device.

9. A radio direction finder comprising a directional receiving antenna, a non-directional receiving antenna, separate amplifier circuits connected with each of said antennae, a visual indicating device, a pair of rectifier circuits connected in opposed phase relation with said visual indicating device, circuit connections for impressing the signal energy amplified by each of said separate amplifier circuits upon said pair of rectifier circuits, a bias determining network connected with the output of one of said amplifier circuits, the output of said bias determining network being connected with the control circuits of both of said amplifier circuits and operative in accordance with the received signal energy to control the amplitude of the combined effective energy impressed upon said visual indicating device, and a separate visual indicator connected with the output of one of said amplifier circuits for providing a simultaneously comparable reading with the reading of said first mentioned visual indicating device.

FREDERICK J. HOOVEN.